(12) United States Patent
Sörvik

(10) Patent No.: US 6,182,725 B1
(45) Date of Patent: Feb. 6, 2001

(54) METHOD FOR TIMBER HARVESTING AND SYSTEM FOR FORESTRY

(76) Inventor: Bengt Sörvik, Årby Gård, Rasbokil, Uppsala (SE)

( * ) Notice: Under 35 U.S.C. 154(b), the term of this patent shall be extended for 0 days.

(21) Appl. No.: 09/297,028

(22) PCT Filed: Oct. 23, 1997

(86) PCT No.: PCT/SE97/01782

§ 371 Date: Apr. 23, 1999

§ 102(e) Date: Apr. 23, 1999

(87) PCT Pub. No.: WO98/17099

PCT Pub. Date: Apr. 30, 1998

(30) Foreign Application Priority Data

Oct. 23, 1996 (SE) ..................................................... 9603880

(51) Int. Cl.[7] .......................... A01G 23/08; B23Q 16/00; B60P 1/48
(52) U.S. Cl. .......................... 144/335; 144/4.1; 144/336; 144/357; 250/223 R; 250/559.25
(58) Field of Search ............................ 144/4.1, 4.8, 34.1, 144/335, 336, 356, 357, 380, 382; 250/559.25, 223 R; 336/394, 385

(56) References Cited

U.S. PATENT DOCUMENTS

| 3,787,700 | 1/1974 | Chasson . | |
|---|---|---|---|
| 4,737,031 | * 4/1988 | Mahlberg et al. | 144/357 |
| 4,947,909 | 8/1990 | Stroud . | |
| 4,982,772 | * 1/1991 | Dutina | 144/357 |
| 5,457,635 | * 10/1995 | Scott | 144/357 |
| 5,949,086 | * 9/1999 | Reponen et al. | 144/357 |

FOREIGN PATENT DOCUMENTS

| 4232412 | 3/1994 | (DE) . |
|---|---|---|
| 0204008 | 12/1986 | (EP) . |
| 8900808 | 2/1989 | (WO) . |
| 9112711 | 9/1991 | (WO) . |

* cited by examiner

*Primary Examiner*—W. Donald Bray
(74) *Attorney, Agent, or Firm*—Browdy and Neimark

(57) ABSTRACT

A method and system for forestry, in particular harvesting by means of a harvesting machine comprising a vehicle and a harvesting arrangement mounted thereon, is based on the fact that at least one position determining device (5) capable of determining the positioning of the harvesting machine by means of external wirelessly receiveable signals is arranged on the harvesting machine (1). A marking device computer, is arranged on the harvesting machine to control the marking device to mark the piece of timber with position information by means of position information received from the position determining device (5).

40 Claims, 7 Drawing Sheets

FIG. 1
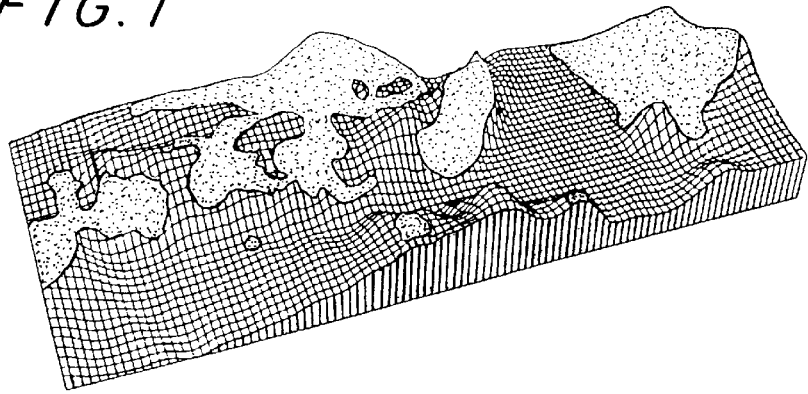
FIG. 2a
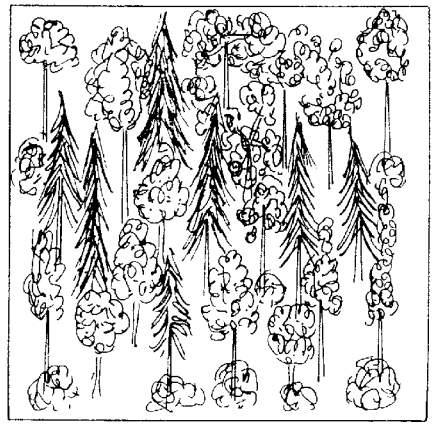
FIG. 2b
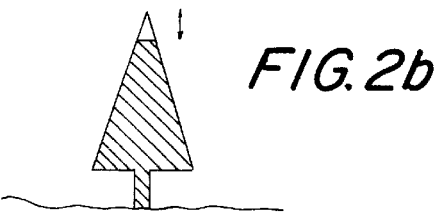
FIG. 2c
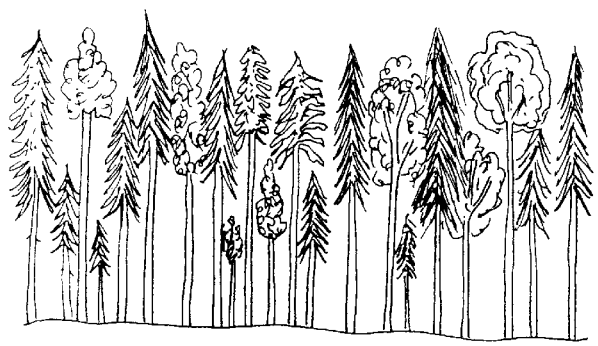
FIG. 2
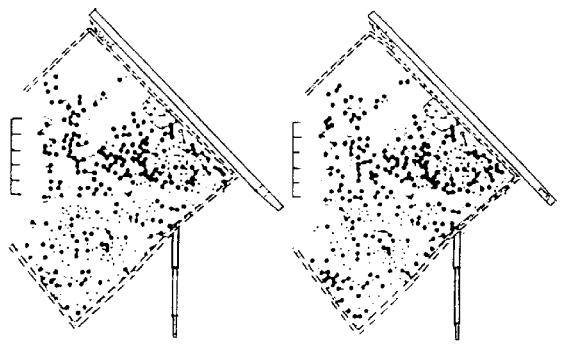
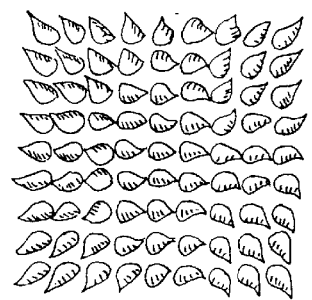

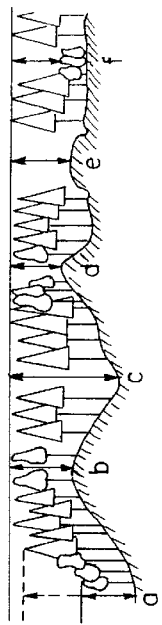
FIG. 3
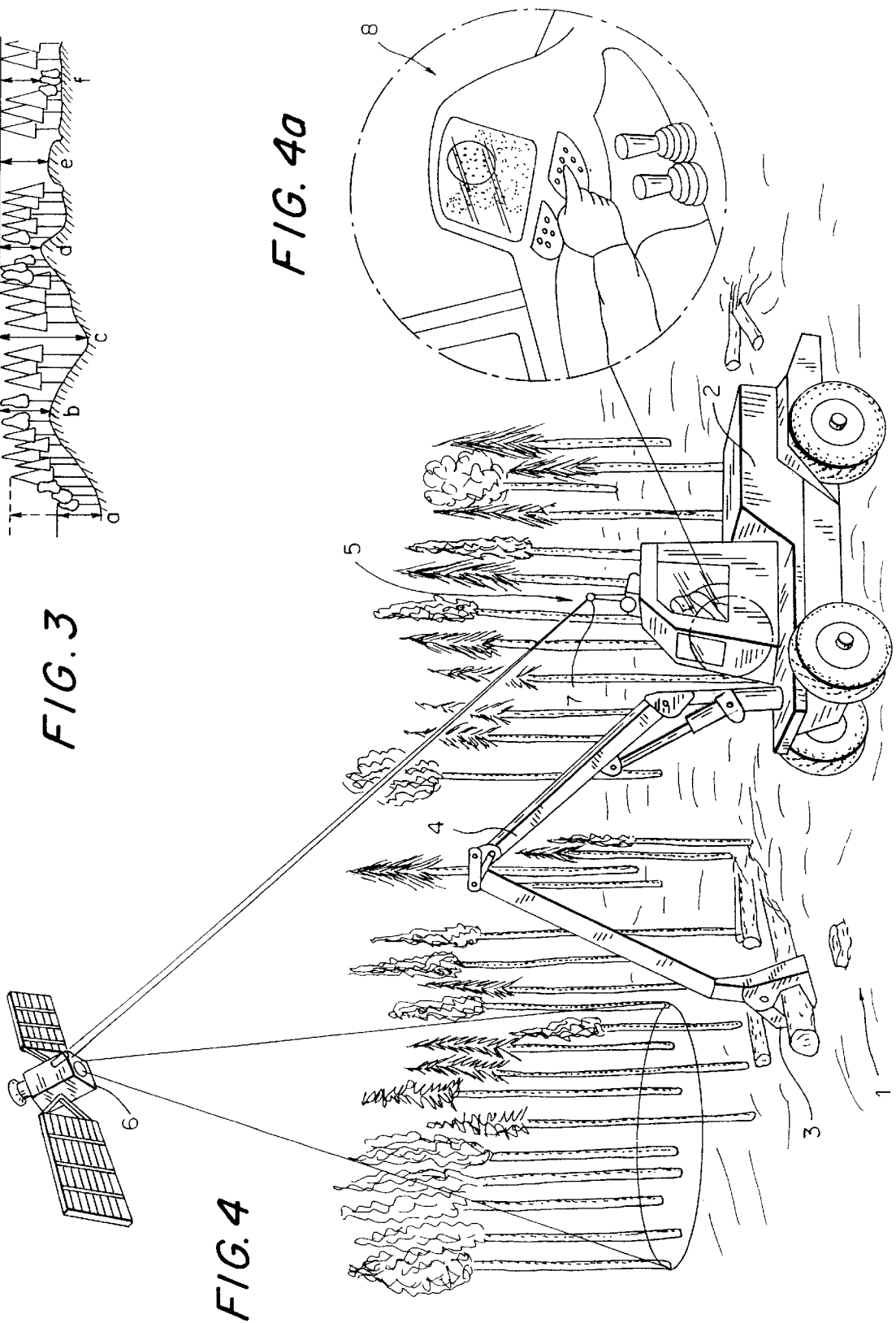
FIG. 4a
FIG. 4

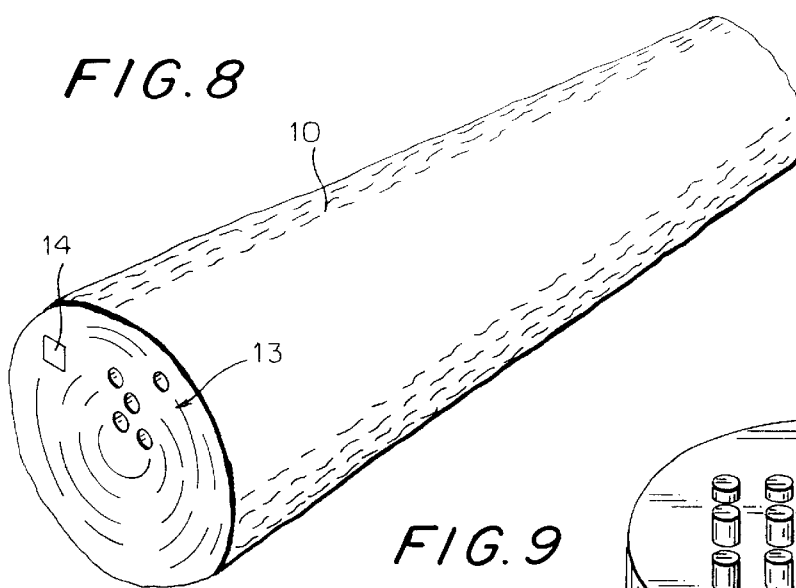
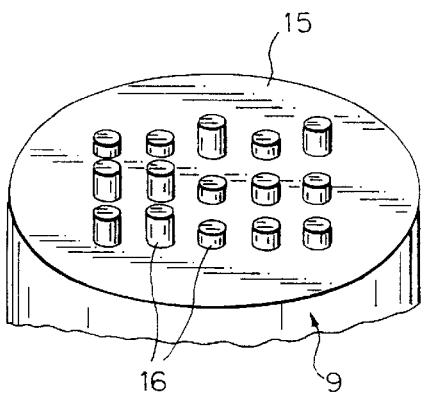
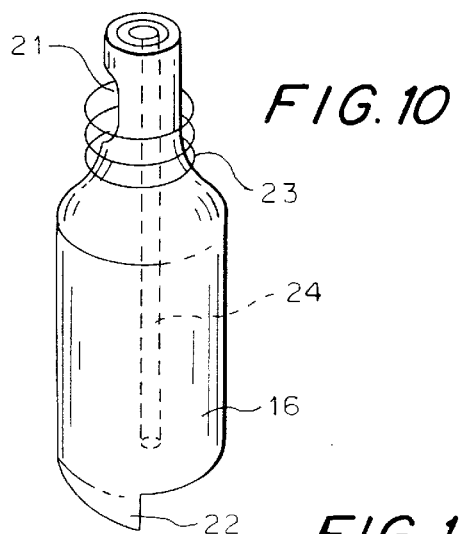
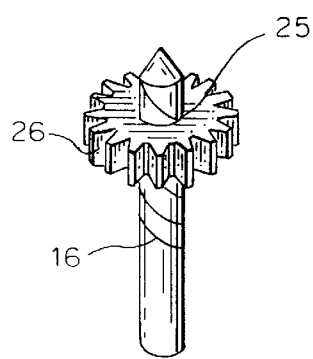
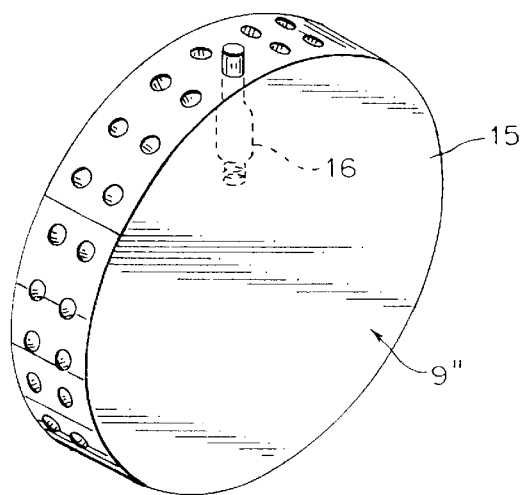
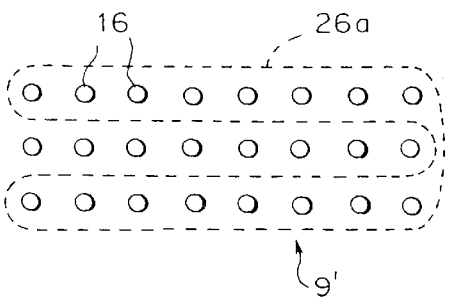

METHOD FOR TIMBER HARVESTING AND SYSTEM FOR FORESTRY

CROSS REFERENCE TO RELATED APPLICATION

The present application is the national stage under 35 U.S.C. 371 of PCT/SE97/01782, filed Oct. 23, 1997.

FIELD OF THE INVENTION AND PRIOR ART

The present invention relates to a method and a system for timber harvesting and forestry according to the preamble of the appended claims 1 and 17.

Conventional timber harvesting and work operations in connection thereto are today carried out comparatively primitively in the sense that the forest raw material is nearly handled as a bulk product without any particularly careful adaptation (marking for cross-cutting) at the moment of harvesting. Even if an evaluation of standing forest timber for sale is carried out as a preparation for a certain harvesting this is regularly of a rather rough type. Accordingly, the real outcome of the harvesting may be considerably different than the outcome theoretically calculated. An additional problem of the timber harvesting technique of today is that is tends to be run in a comparatively small scale in the sense that as a rule only one seller and one buyer of wood raw material are involved in a certain harvesting. Borders between different forest owners have to be carefully considered, which is a consequence of the fact that the forest raw material is not possible to identify in detail.

The consequences of the shortcomings mentioned above are considerable costs. A large amount of manual planning and administration work is required.

SUMMARY OF THE INVENTION

The object of the present invention is primarily to create conditions for handling the wood raw material not as an anonymous bulk product but as products having an identity.

For obtaining this object the present invention delivers the solution that in a method for harvesting by means of a harvesting machine comprising a vehicle and a harvesting arrangement mounted thereon the position of the harvesting machine is determined in connection to felling a tree and at least one piece of timber obtained from the tree is marked with the position information.

The piece of timber so obtained will by this become and individual connectable to the location of growth in question, which means that the individual forest owner with certainty is able to determine if the piece of timber in question belongs to him or any other after the transport of the piece of timber away from the very harvesting place.

The conversion of the timber raw material from a bulk product into individuals able to be identified described above means also that not only a plurality of sellers may be comfortably kept apart with respect to their products, but a plurality of buyers may also be handled on one and the same location of harvesting. When the idea of the invention is consummately utilised the position information marked on the piece of timber is intended to be that exact that it shall be possible to state from exactly which tree the piece of timber emanates. The analysis of the timber stock taken place before the harvesting is also intended to be carried out through the remote analysis technique discussed below that precisely that precisely that the individual tree may be unambiguously determined with respect to position and also be forecasted with a rather high accuracy with respect to timber quality and volume. Such an accurate analysis in advance means conditions for a very accurate calculation of the yield of a certain harvesting in advance. Furthermore, the very harvesting may be very purposefully controlled so that exactly the trees to be harvested for an optimum result also really get harvested. According to the invention a control unit arranged on the harvesting machine may be adapted to control the harvesting machine on the basis of data emanating from the pre-analysis of the forest region and harvesting instructions determined on the basis thereof to only harvest exactly the trees determined in advance to be harvested. Such a high resolution, i.e. at the level of a single tree, may be achieved if an accurate registration of the forest is carried out by means of a photographical or other registration technique and these registrations are accurately co-ordinated with geographically correct conditions. Furthermore, a very high resolution is required with respect to the position determining device arranged on the harvesting machine. Such a high resolution is today already obtainable by means of the satellite-based GPS-system (GPS=Global Positioning System.)

According to a preferred embodiment of the invention the marking on the single pieces of timber intended for sawing into boards is read before the sawing and this marking information is stored so that the boards emanating from the piece of timber may by means therefore be provided with a marking including at least information about the growth location of the original tree. Conditions for an additional check of the harvesting result with respect to both volume and quality are by that created. It is possible to correlate information about the actual yield of boards from the piece of timber and identity information with respect to exactly this piece of timber in the sawmill so that an exact conclusion with respect to the yield of the individual tree may be made. The land owner gets substantially improved possibilities to check that forest stocks valuable according to evaluations of standing timber forest for sale carried out also really arrive to the economical yield expected and are not substantially degraded in the chain of handling the timber, for example as a consequence of an incompetent adaptation or an inadequate handling from another point of view.

Even if the optimum advantage of the invention is obtainable when the preanalysis and the harvesting take place with an accuracy corresponding to a resolution in the order of individual trees as discussed above, a less accurate resolution than that may be utilised when the idea of the invention is carried out to a smaller extent, for example a resolution in the order of one or some meters.

Specific features with respect to the system according to the invention appear from the following claims.

Details and advantages in connection to the invention are dealt with in the detailed description following.

BRIEF DESCRIPTION OF THE DRAWINGS

With reference to the appended drawings, below follows a specific description of preferred embodiments of the invention cited as examples.

In the drawings:

FIG. 1 is a view illustrating how data obtained by aircrafts or otherwise may be utilised for reproduction of landscapes in a digital topographical model with a high map accuracy.

FIG. 2 is a schematic view illustrating a forest stock, in which more exactly FIG. 2a shows a drawing of an aerial photograph of a portion of a forest FIG. 2b, a side elevation of a normal portion of a forest and FIG. 2c a schematic view of the portion of forest as seen from above.

FIG. 3 is a view illustrating how pure landscape data and forest raw material data may be combined for facilitating strategical planning with respect to the forest.

FIG. 4 is a schematic illustration showing a forest harvesting machine in a practical working situation.

FIG. 8 is a schematic view illustrating how a piece of timber is marked at one end thereof according to the invention.

FIG. 9 is a schematic perspective view illustrating a marking device with marking means movable between active and inactive positions.

FIG. 10 is a schematic view of a marking means having the character of a punch.

FIGS. 11a and b are schematic views illustrating an alternative marking device.

FIG. 12 is a view showing an additional alternative to the marking device.

DETAILED DESCRIPTION OF A PREFERRED EMBODIMENT

Figure 5:
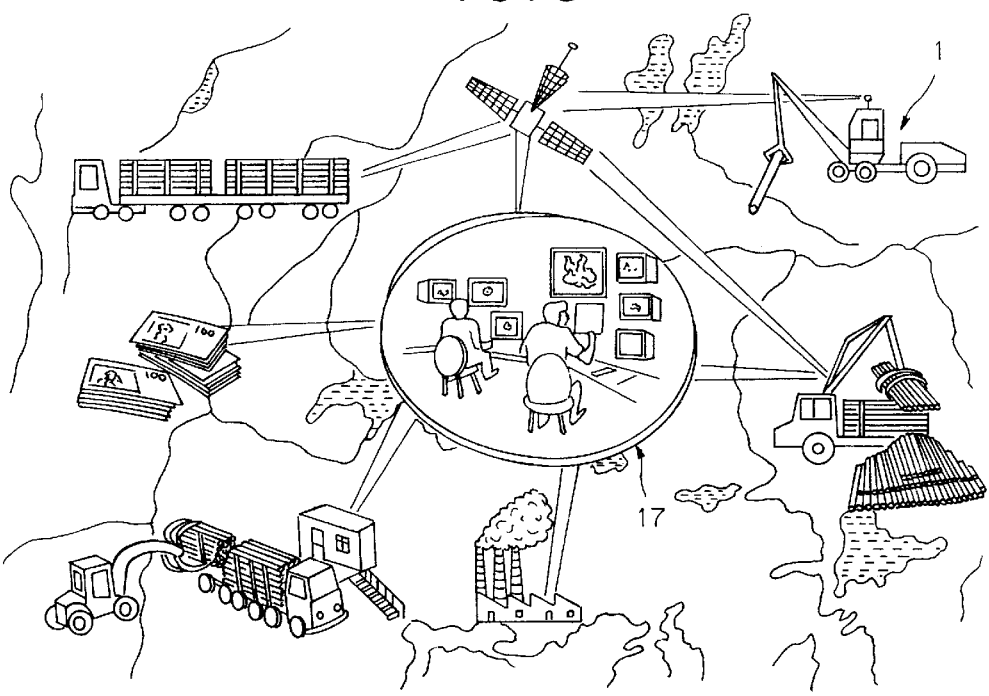
FIG. 5 is a schematic view illustrating how a forest harvesting organisation may be connected to an operating centre.

It is desired to produce a basis for forestry decisions of high quality for completely utilising the advantages of the invention. It is on one hand aimed at being able to establish descriptions connected to the ground (geology, quaternary geology, nature geography, hydrology, climatology, pedology, vegetation biology, nutrition geology and various planning maps) of a very high quality and with a high cost efficiency. It is illustrated in FIG. 1 how it is possible by means of different registration techniques, in particular from aircrafts, to derive data which may be used for reproducing the landscape in a digital topological model with a high map accuracy. Furthermore, it is required that the forest stock in the landscape region in question is accurately registered. Different techniques to register the forest stock from aircrafts, for example photogrammetry and picture analysis technique, are preferably also used here. An aerial photograph is illustrated in FIG. 2 at a, from which it is possible to distinguishing individual trees. By a suitable picture analysis technique and knowledge about characteristics of different types of trees and the living pattern thereof under different conditions, it is possible to get a comparatively accurate comprehension of the timber quality and timber volume with respect to individual trees. By a really accurate reproduction technique and relating the reproductions to exact map coordinates the individual tree may also be determined with respect to position at a very high accuracy, namely in the order of centimetres or at least decimetres. It is indicated in FIG. 2c how there is a tendency to apprehend the individual trees as inclining away from the centre of the picture in central projection with respect to the reproduction technique. A good evaluation of standing forest timber for sale may be carried out while considering shadow effects, conicities of silhouettes of trees, diameters of leaf and needle masses, colours thereof etc. This evaluation may form a basis for very accurate and exact decisions with respect to harvesting strategy.

It is illustrated if FIG. 3 how landscape and forest raw material data are combined in a cross-section reproduction facilitating the planning of the harvesting.

A harvesting machine generally denominated by 1 comprising a base vehicle denominated by 2 and a harvesting arrangement 3 mounted thereon is illustrated in FIG. 4. The harvesting arrangement 3 is in the example carried with respect to the base vehicle 2 by means of a crane 4. The harvesting arrangement 3 is here a so-called one grip harvesting arrangement, i.e. an arrangement adapted to grip a standing tree, cut it, lay the tree down to the position according to FIG. 4 and then by means of feeding means drive the log through the arrangement while simultaneously branching the log. The log may be cross-cut into individual pieces of timber by means of the cutting means. It is emphasised that the present invention is in this respect just as well applicable to cases in which there is a desire to abandon branching of the log, i.e. where it is only cross-cut into pieces of timber. However, the invention is also applicable to so-called full log handling, i.e. where the harvesting arrangement is utilised so as to cut the tree off and fell it, but after which no cross-cutting of the log into smaller pieces is carried out. The expression "piece of timber" used is the claims is in such a case intended to also cover the log as a whole. The harvesting arrangement may if desired be provided with branching means so as to relieve the log from branches by driving the log through the arrangement also in full log handling. A positioning determining device generally denominated by 5 is arranged on the harvesting machine and capable of determining the position of the harvesting machine by means of external signals received wirelessly. It is preferred that the positioning determining device operates according to the GPS-system (GPS=Global Positioning System). This is a satellite based positioning system creating conditions for a very high accuracy with respect to positioning determination. The satellite signals are in the reality disturbed. The disturbances are in the practice corrected by means of signals emitted from a ground station. These signals are received by the positioning determining device and may together with the satellite signals result in the very high positioning determining accuracy aimed at.

A GPS-satellite is indicated by 6 in FIG. 4, while an aerial of the positioning determining device 5 is indicated by 7. In the view within the enlarged circle in FIG. 4 it is indicated how the driver of the harvesting machine has access to a control unit, suitably a computer with a displaying screen, which is connected to the positioning determining device. This control unit may in the reality be the adaptation computer of the harvesting machine, provided with software and possibly hardware for the positioning determining treatment.

A marking device is arranged on the harvesting machine 1, it is in one embodiment illustrated in FIG. 9 and is there generally indicated by 9. This marking device 9 is adapted to apply markings on pieces of timber obtained from trees. The marking device 9 is by means of the control unit 8 controlled to mark the piece of timber (see for example the one indicated by 10 in FIG. 8) with position information, i.e. with information about the location of growth of the tree, by means of position information received from the position determining device 5.

Figure 7:
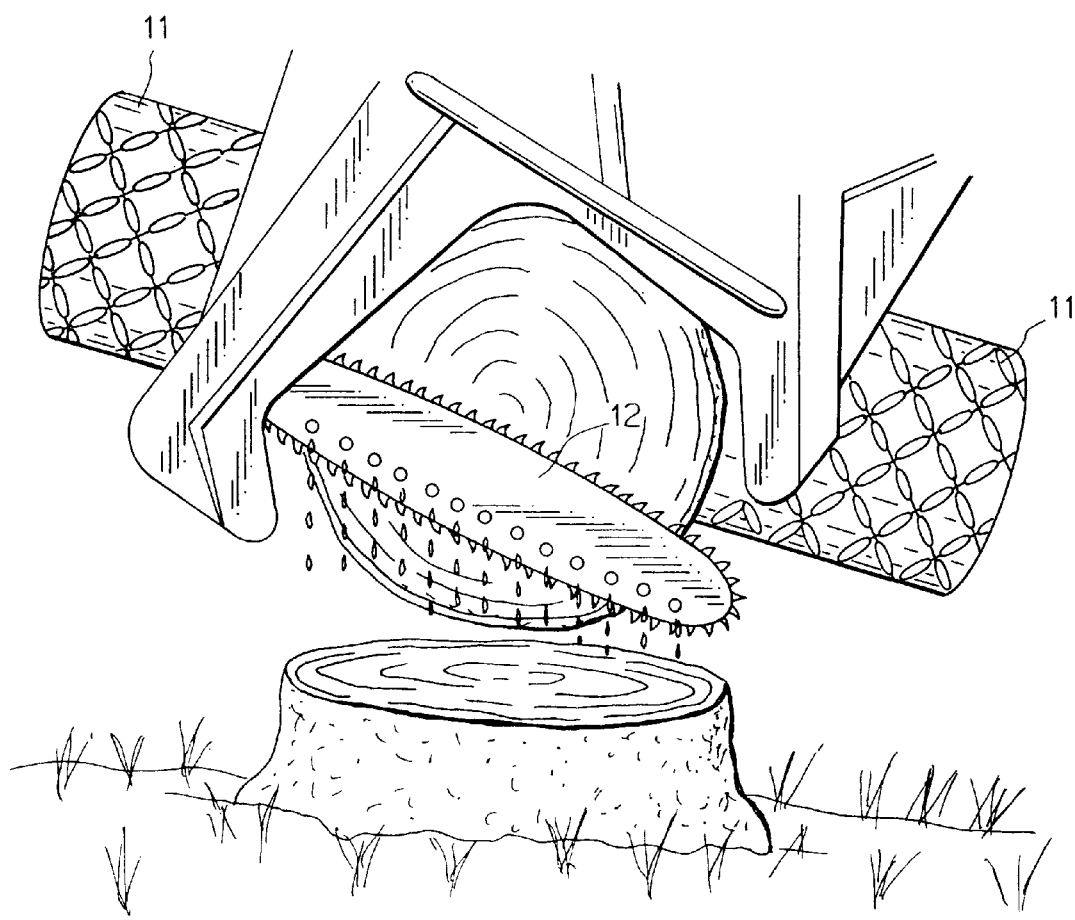
FIG. 7 is a perspective detailed view illustrating the discharging end of the harvesting arrangement provided with a cutting means.

The harvesting machine 1 comprises means for determining/input of information with respect to quality and/or size of the piece of timber. The control unit 8 is adapted to control the marking device 9 to mark the piece of timber with information about quality and size. In the case that a plurality of pieces of timber are produced from a single log it is advantageous that the harvesting machine 1 comprises means for automatically determining/by hand feeding in information about the location of this piece of timber in the log and that the control unit 8 is adapted to control the marking device to mark the piece of timber with the location information. Furthermore, it is desired to mark the piece of timber with information related to the actual buyer of the piece of timber and possibly also with information relating to the seller of the piece of timber. The seller information is sure unnecessary would it be possible to connect the seller to the location of growth of the tree. The discharging end of the harvesting arrangement 3 is indicated in FIG. 7, i.e. the end where pieces of timber are discharged by means of feeding means 11 of the arrangement. The arrangement has at this discharging end a cutting means 12 intended to cut off the pieces of timber fed thereto. The cutting means 12 is in the example a saw sword being pivotally arranged and having a chain running around. Other cutting means may of course also be possible. The marking device according to the invention is preferably arranged at the outlet end of the harvesting arrangement, so that a piece of timber fed thereto according to an embodiment is intended to be marked immediately after cutting it off from the rest of the log. Accordingly, the marking may be applied on the end of a piece of timber falling freely, which put rather high demands on the velocity. However, other embodiments are also well possible. Thus, the marking device may be adapted to apply the marking on the mantle surface of the piece of timber, possibly after relieving a portion of this mantle surface from bark. According to another embodiment it would also be possible to mark a piece of timber not separated from the rest of the log, but this means that then a prognosis has to be made with respect to the quality and volume of this piece of timber. If the prognosis will not be correct there will be a difference.

A possibility to carry out the marking of the piece of timber is to combine the marking device and the cutting means 12, for example by providing the cutting means 12 with marking means suitable for the purpose. These may be of contacting as well as non-contacting type. The marking means may according to a possible embodiment have the character of spray nozzles adapted to spray a marking having an information content already discussed above on the piece of timber just being cut. A condition for this is a comparatively large number of spray nozzles. It would in principle be possible to apply a marking having a considerable information content over the entire end of the piece of timber. A more restricted content is of course also conceivable.

It is illustrated in FIG. 8 how a piece of timber 10 schematically indicated has been provided with a marking indicated by 13 and consisting of a matrix of holes punched into the end of the piece of timber. The marking has suitably also a reference mark 14 for enabling an adequate reading of the matrix. The number of possible holes in the matrix may be very large, for example 100 or more depending upon on the volume of information required. It is advantageous to apply the marking into the end surface of a piece of timber, since this would normally facilitate the following reading of the marking information.

It is illustrated if FIG. 9 how the marking device 9 comprises a body indicated by 15, in which a number of marking means are arranged. These have in the example the character of punching means, which are selectively moveable between active marking positions and inactive rest positions. The punching means are in the example intended to be in their active positions when they are projected and in their inactive positions when they are retracted. Thus these punching means are intended to be pressed against the end of the piece of timber so that the marking means active for the moment, i.e. projected, are projected into the end surface of the piece of timber.

It is illustrated in FIG. 5 how the harvesting organisation may be connected together to an operating centre 17, which may communicate with different units in the harvesting organisation through telephone and radio technique etc. The harvesting machine in indicated by 1. Information about the forest harvested is sent from the control unit 8 thereof to the operating centre 17 and signals appropriate for controlling the harvesting work of the harvesting machine 1, for example so that the harvesting is focused upon the assortment asked for for the time being, are sent from the operating centre 17 to the harvesting machine 1. The operating centre 17 is for the rest in contact with other units is the harvesting organisation such as transporting vehicles and forest raw material consumers, for example sawmills and pulp industries. The operating centre 17 may through the GPS-system efficiently keep record of the location of the different harvesting units and efficiency plan the harvesting work. The operating centre 17 will at each point of time have data telling where volumes of timber are available and may be made available through harvesting, respectively, and which are the qualities and volumes considered, so that business agreements may be closed very quickly by means of the operating centre. Expressed in another way, the operating centre may function as an "electronic" timber exchange.

Figure 6:
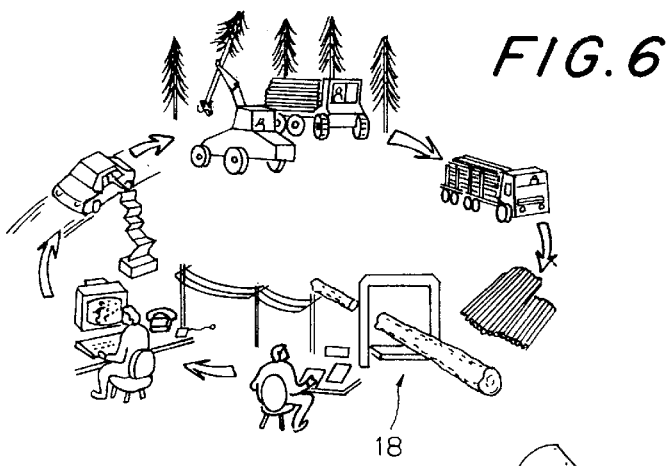
FIG. 6 is a schematic view intended to illustrate how identity and origin with respect to a certain piece of timber may be followed in the flow to the customer as a consequence of the marking method according to invention.
Figure 6A:
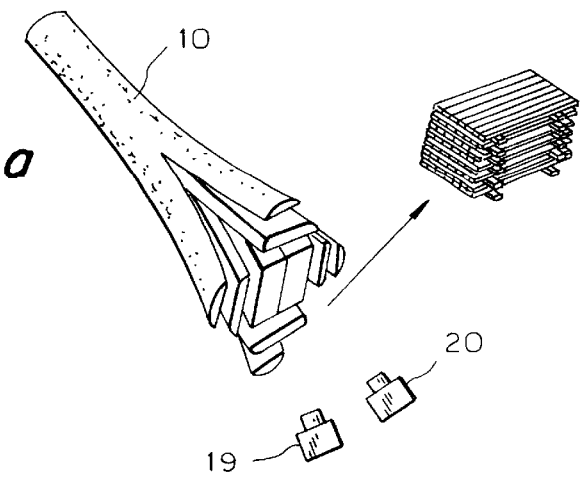

It is illustrated in FIG. 6 how the log 10 is ready for sawing it into boards is a sawmill. The sawing intake is schematically indicated by 18. A reproducing device 19 is arranged in connection to the sawing intake and adapted to reproduce an end surface of the piece of timber before the sawing and register and store information in this picture with respect to shape, for example diameter and thickness of bark, and/or growth, for example annual ring widths. By means of the information obtained through the reproducing device 19 equipment included in the system may produce analyses and prognosis with respect to forest growth over the time relating to the forest region from which the pieces of timber emanate. A condition for this is of course that a reading device 20 is present and arranged at the sawing intake to read the marking of an individual piece of timber and store the marking information. A control unit associated with the sawmill is adapted to control an additional marking device in the sawmill to provide boards deriving from the piece of timber 10 in question with a marking including at least information about the original location of growth of the tree. Boards may in this way be obtained, which may be checked with respect to location of growth, so that buyers having an environment consciousness may ensure that they buy boards coming from sources being acceptable from the environmental point of view.

The reproducing device 19 and the reading device 20 may of course in the reality consist of one and the same unit.

The marking of the piece of timber 10 and the reading of this marking makes it possible to correlate the marking with information about the real economical yield of the piece of timber after the sawing. Data concerning this yield and the location of growth of the piece of timber may then be compared with information already present in the forest data base, namely information initially obtained within the frame of the evaluation of standing forest timber for sale and then information applied on the piece of timber in connection to the harvesting by means of the marking device combined with the harvesting arrangement.

It is illustrated in FIG. 10 how the marking means 16 already indicated in FIG. 9 could be constructed. The marking means having the character of a punch has suitably a tube-like front end, which upon pressing into the wood material of the piece of timber will receive a piece of wood. The punching means 16 has a lateral opening 21 through which wood material entering into the tube-like end of the punching means may exit. The punching means 16 is pivotally arranged about an axis in parallel with the punching direction, so that accordingly the wood material entering into the punching end of the punching means may be broken apart from the piece of timber and may be brought to exit through the opening 21.

A cam-like projecting means 22 is arranged for projecting the punching means 16 to the active position thereof, and this means is adapted to both project the punching means and make it turn. The projecting means 22 turns at the return movement thereof the punching means back to the starting position thereof. The projecting means 22 may then also be arranged to forcedly retract the punching means or as an alternative (or as a complement) a spring 23 indicated in FIG. 10 may serve for the returning movement.

It is possible to combine the punching means 16 in FIG. 10 with an ink marking, suitably by providing the punching means with an ink channel 24, through which marking ink is supplied from a source to the region of the front mouth of the punching means. Thus, the intention is that the hole resulting in the end of the piece of timber after punching shall be provided with ink so that this appears clearly.

An alternative 9' of the marking device is illustrated in FIG. 11. The marking means 16 consist here of a number of comparatively small drills arranged in a matrix and accordingly rotatably arranged. Each of these drills may for example be adapted to be received in a centre opening 25 of a gear denominated by 26, which on the outer side thereof has a toothing intended to engage with a cam belt 26a. The drills 16 and the hole 25 in the gear have engaging means preventing relative rotation of the drills with respect to the gear. When the cam belt 27 is running in the path shown is FIG. 11b, the cam belt is accordingly intended to be engaged with the different gears 26, which accordingly are rotated and the drills 16 are at the same time brought to rotate. The drills 16 are displaceable axially with respect to the gears 26, so that accordingly the drills desired may be brought into active marking positions by axial displacing means not illustrated in FIG. 11. The function is then similar to that already described by means of FIG. 9, i.e. the drill-like marking means 16 to be active for the moment are projected, while the other are kept retracted.

In the alternative 9" illustrated in FIG. 12 the body 15 of the marking device has the character of a rotatable wheel. The marking means 16 are here radially movable, so that they may be brought to project through peripheral openings in the wheel. Accordingly actuating means are arranged inside the wheel so that the marking means 16 may selectively be brought to protrude and by that give the piece of timber in question the marking aimed at. The marking device according to FIG. 12 could be utilised so as to mark the mantle surface of the piece of timber, possibly on a portion relieved from bark or otherwise through or on the very bark, but it would also be possible to adapt the wheel principle when marking the end surface of a piece of timber.

Other marking techniques are of course also conceivable. A beneficial marking technique is based on the use of means emitting laser jets, which apply the marking aimed at on the log, for example in the form of a bar code or in another way. A number of laser marking means could be arranged in matrix form in the way already described with respect to the mechanical embodiments. Other radiant energy besides the laser technique may of course be utilised for marking purposes.

It is also possible to design the marking device so that is applies the marking information required on a separate carrier, which in its turn is applied on the piece of timber. This could for example be a strip provided with marking information in the form of a bar code or another code.

Figure 13:
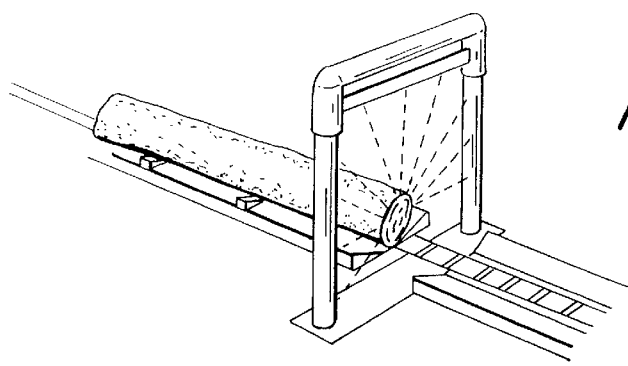
FIG. 13 is a perspective view of a cleaning device in connection to the intake of a sawmill.

It is illustrated in FIG. 13 how a particular cleaning equipment may be arranged at the intake to a sawmill for relieving a piece of timber from contaminations, snow or ice, which otherwise would tend to render the reading of the marking information more difficult. The cleaning device may for example have the character of a steam shower. In the case that marking information is only applied on the end of the wood unit it is of course sufficient to carry out the cleaning operation there.

It is emphasised that reading devices such as those indicated by 19 and 20 in FIG. 6 may of course not only be arranged in connection to a sawmill or the like. Such reading devices could be arranged on other locations, where there is a need to assort pieces of timber depending upon the marking present thereon. Thus, each buyer may be supplied with the pieces of timber he needs. The marking technique means in general that each individual piece of timber may be handled individual in the harvesting system described by means of FIG. 5, so that a buyer accordingly has substantially better prospects of really arriving to a possession of pieces of timber best suited for his fields of use.

Figure 14:
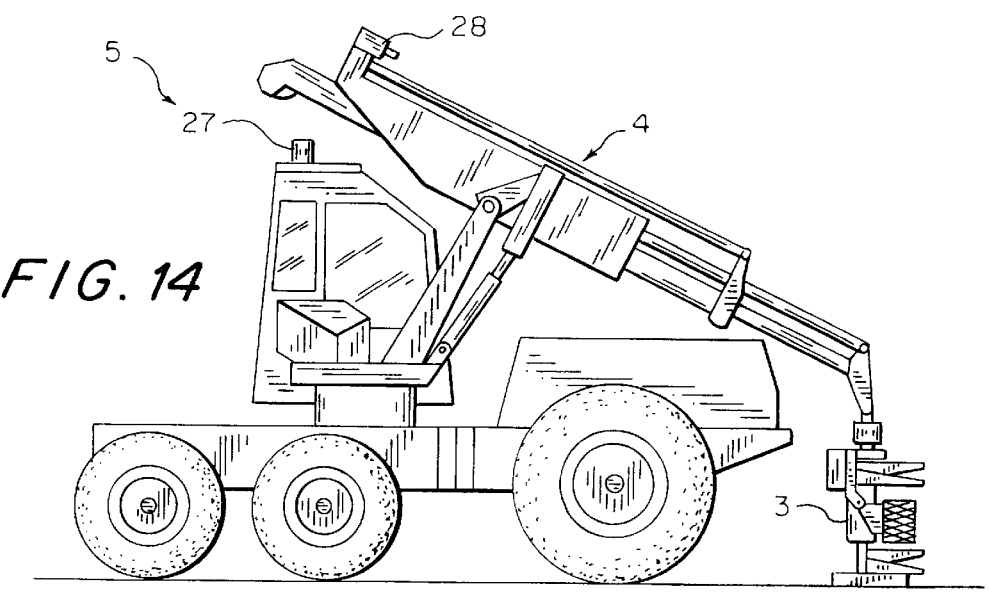
FIG. 14 is a schematic view illustrating a harvesting machine provided with a position determining device comprising a position determining unit on the vehicle of the harvesting machine and means for determining the position of the harvesting arrangement with respect to the position determining unit.

A harvesting machine as before having a position determining device 5 is illustrated in FIG. 14. The crane utilised in FIG. 14 has somewhat other construction than the one illustrated in FIG. 4. The position determining device 5 is as in the embodiment according to FIG. 4 in the embodiment according to FIG. 14 so designed that it has a position determining unit 27 on the vehicle, for example on the cabin being turnable in this example, while the position determining device also comprises means for determining the position of the harvesting arrangement 3 with respect to the position determining unit 27. Since the position of the unit 27 is known and the relative position of the unit 27 and the arrangement 3 may also be determined, a tree present in the arrangement 3 will accordingly also in the reality be determined with respect to position.

The means for determining the position of the harvesting arrangement 3 with respect to the unit 27 comprise in FIG. 14 a distance metere indicated by 28, for example of laser type, which is capable of measuring the distance therefrom to the log of a tree held in the arrangement 3. If this distance meter 28 is combined with angle sensors in each hinge between two mutually moveable arm parts in the crane and also a direction sensor (compass) on the crane 4 or the cabin, the distance and direction of the arrangement 3 from the unit 27 could be very accurately determined. The position of the arrangement 3 may then be compared with data in the control unit of the harvesting machine, so that the driver could compare the actual position of the harvesting arrangement 3 with the desired position according to the harvesting instruction. The driver could by this much easier find the trees, which he has to eliminate according to the harvesting instruction.

Figure 15:
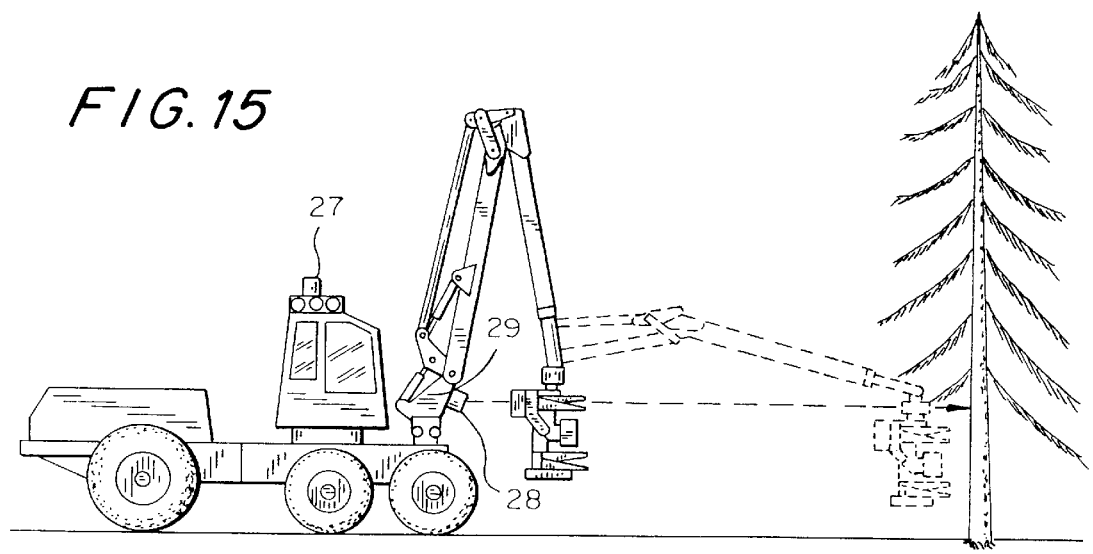
FIG. 15 is a view of a solution being an alternative to that illustrated in FIG. 14.

A somewhat different type of harvesting machine is illustrated in FIG. 15. The very vehicle is also here intended to have a position determining unit 27 and a distance meter indicated by 28. The meter serves for measuring the distance between the log and a part 29 of the crane solely turnably moveable with respect to the vehicle. In the case that the part 29 and the vehicle cabin, i.e. the part where the unit 27 in mounted, are not mutually turnable but turn as a unit around a vertical axis only one sensor is required besides that, i.e. a compass, for turning adjustment of the cabin/part 29. Would it however be so that the part 29 would be turnable around a vertical axis with respect to the cabin an additional angle sensor would be needed between this part 29 and the rest of the vehicle.

Figure 16:
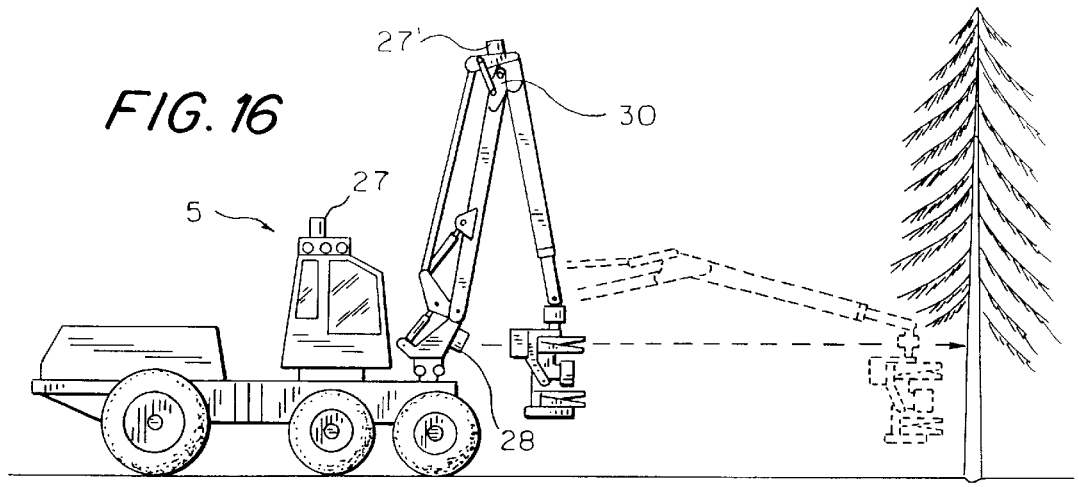
FIG. 16 is a further alternative.

An alternative, in which the position determining device 5 comprises two position determining units 27 and 27', respectively, is illustrated in FIG. 16. It appears that the unit 27 is arranged on the vehicle cabin, while the unit 27' is located on the crane. The presence of two such position determining units, which are suitably connected to the control unit 8 present in the harvesting machine, the latter unit being capable of evaluating signals from the units for position determining purposes, means that the direction of the cranes may always be determined, also during movement. This embodiment has as in the previous embodiment a distance meter 28. This means that the only further sensing device required for unambiguously determining the position of a log present in the harvesting arrangement is an angle sensor indicated by 30 between the two outermost arm parts of the crane. It is in this context pointed out that the second position determining unit 27' should suitably not be placed too close to the harvesting arrangement since it will then be a risk that it is damaged and for the rest will be hidden by branches, needle and leaf systems.

Figure 17:
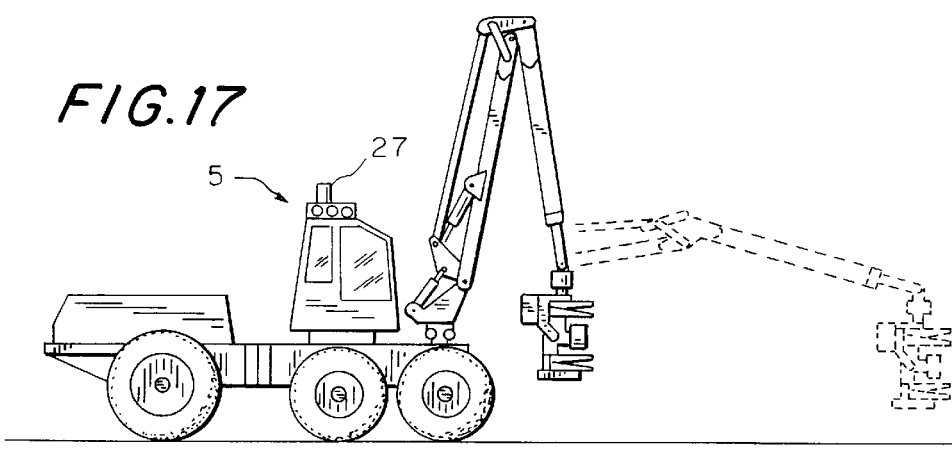
FIG. 17 is a still further alternative.

The alternative illustrated in FIG. 17 has again a position determining device 5 with a positioning determining unit 27 on the vehicle cabin. The embodiment is in the alternative according to FIG. 17 intended to be such that at each hinge connection in the crane there is an angle sensor. This is also valid for the connection between the crane and the vehicle. Furthermore, the arrangement has to completed by a direction sensor, i.e. a compass for determining the crane direction with respect to the position determining unit 27.

Figure 18:
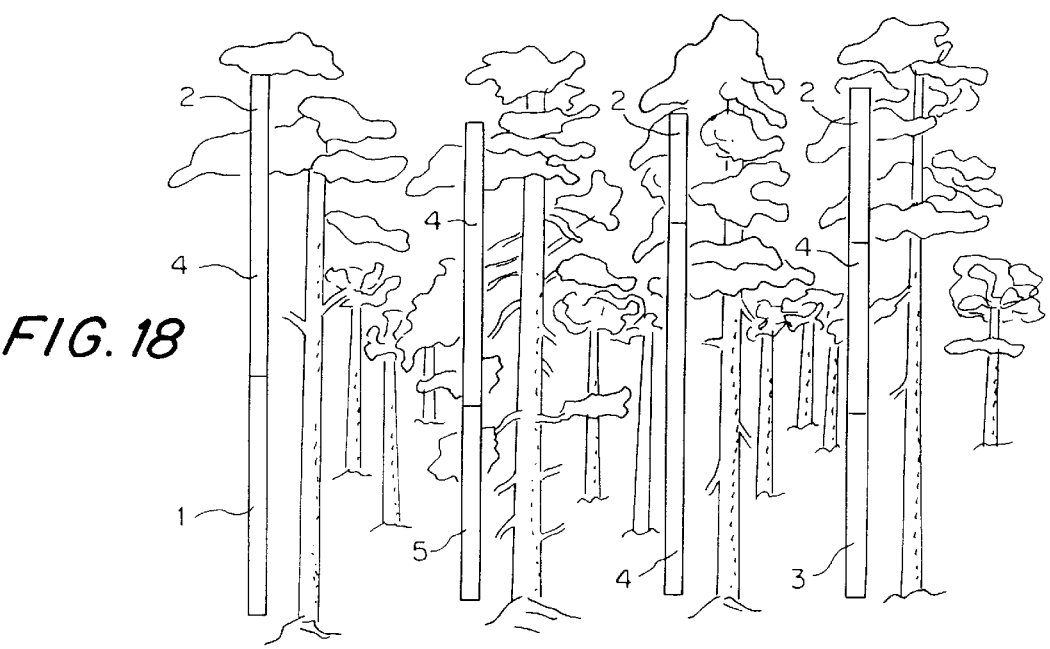
FIG. 18 is schematic view illustrating how a scanner arranged on the harvesting machine may be utilised for scanning trees to be harvested so that scanning information may be utilised by means of the control unit for taking decisions with respect to adaptation or a prognosis of adaptation (determining where cross-cutting is to be carried out).

It is illustrated in FIG. 18 how the distance meters 28 present in FIGS. 14, 15 and 16 could be brought to fulfill and additional function, namely as scanner for scanning trees to be harvested before felling the tree in question. Such a scanner, for example of the laser type, is suitably connected to the control unit in the harvesting machine for supplying scanning information thereto, which is utilised by the control unit for determining adaptation or making an adaptation prognosis. It is schematically illustrated in FIG. 18 how picture information with respect to adjacent trees created by the scanner 28 may be utilised as basis for giving adaptation suggestions after suitable signal treatment in the control unit beside the trees in question (the dark columns provided with numerals beside the trees in FIG. 18), in which quality classes may also be stated.

The prognosis of adaptation or marking for cross-cutting determined by the scanner 28 could be compensated or adjusted by an adequate comparison with the measuring result given rise to by the previous evaluation of standing forest timber for sale with respect to the individual tree. Thus, this means that the driver of the harvesting machine could through the control unit 8 in the harvesting machine receive a substantially more refined adaptation suggestion from the control unit.

It is emphasised that the application of the invention is of course not restricted to the type of harvesting machines illustrated in the drawings. Accordingly, the invention is also applicable to such harvesting machines in which in the crane only a so called felling head is arranged, i.e. a unit capable to cut off and lay down a tree, which then by means of the crane is laid into a processing machine arranged on the vehicle chassis, which normally includes both branching means and cutting means. Thus, in such a machine it is the very felling head that has to be considered as equivalent to the harvesting arrangement discussed in the description above in the sense that it is the position of the felling head in the cross-country that is to be determined with respect to position so as to by that determine the position of the tree. Otherwise expressed, it is completely offset with respect to the idea of the invention whether additional processing equipment besides the tree felling part are combined with the tree felling part, i.e. mounted on the crane, or instead arranged on the vehicle chassis so that the logs are laid by means of the crane into the processing part.

It is realised that the invention is not solely restricted to the embodiments discussed above. It is for example pointed out that it would be possible to determine the position of the harvesting arrangement with respect to a position determining unit arranged on the harvesting machine by means of arbitrary sensing techniques, such as videophotogrammetry, another video technique etc. It is in general pointed out that many modifications are offered for the man skilled in the art once the basic idea of the invention has been presented.

What is claimed is:

1. Method for timber harvesting with a harvesting machine comprising a vehicle (2), a harvesting arrangement (3) mounted thereon and a marking device (9) arranged on the vehicle to apply a mark (13) on at least one piece of timber (10) obtained from a tree, said method comprising:
   determining the position of the harvesting machine with at least one position determining device (5) arranged on the harvesting machine, said position determining device being capable of determining the position of the harvesting machine from external, wirelessly receivable signals, in connection with felling a tree, and
   marking at least one piece of timber obtained from the tree with the position information by said marking device (9) arranged on the vehicle.

2. Method according to claim 1, further comprising in that the piece of timber with Information regarding quality and size.

3. Method according to claim 2, further comprising in that in the case where of pieces of timber are obtained from a tree, marking every current piece of timber with information regarding its location in the timber log.

4. Method according to claim 1, further comprising in that every single piece of timber with information regarding the buyer and/or seller of the piece of timber.

5. Method according to claim 1, wherein the marking is carried out by a marking technique comprising contacting the piece of timber by at least one of punching, cutting, drilling, and stamping.

6. A method according to claim 1, wherein the marking is carried out by a non-contacting marking technique of application of at least one of radiant energy and ink-spraying.

7. Method according to claim 1, wherein the harvesting machine position information which is applied on the piece of timber refers to the position of the harvesting arrangement of the harvesting machine.

8. Method according to claim 1, wherein the marking of the piece of timber is carried out on an end thereof.

9. Method according to claim 1, wherein the marking is carried out on a portion of the mantle surface of the piece of timber optionally after bark has been removed therefrom.

10. Method according to claim 1, wherein, prior to the harvesting, date regarding growth locations, quantities, sizes and optionally locations in the tree of pieces of timber is compared with prognoses concerning the outcome of the harvesting.

11. Method according to claim 1, wherein before the harvesting concerning single trees or relatively small timbered surfaces, evaluation within an area that is to be harvested or thinned is carried by remote analyses.

12. Method according to claim 11, wherein the harvesting is controlled with the aid of said evaluation of standing forest timber for sale by means of data provided to the harvesting machine so that the harvesting of timber qualities and sizes demanded for the moment are priorited during the harvesting.

13. Method for sawing pieces of timber harvested in accordance with the method in claim 1 to boards, comprising reading the marking on a single piece of timber before the sawing and stored and that boards from this piece of timber are provided with a marking including at least information about the growth location of the original tree.

14. Method according to claim 13, further comprising copying an end surface of the piece of timber before the sawing to obtain a reproduction, and storing information in said reproduction regarding at least one of shape, diameter, bark thickness, and growth.

15. Method according to claim 14, therefore forest growth over a time period are carried out supported by said information about shape and/or growth concerning the forest area from which the pieces of timber emanates.

16. Method according to claim 1 further comprising scanning a tree, which is to be harvested by the harvesting machine, before the tree is felled, by using a scanner, which is arranged on the harvesting machine and wherein the information so obtained is utilized as guiding means for the adaptation or an adaptation prognosis.

17. In a system for forestry including timber harvesting with a harvesting machine (1) comprising a vehicle (2), a harvesting arrangement (3) mounted thereon, a marking device (9) arranged on the harvesting machine, said marking device being adapted to apply a mark (13) on at least one piece of timber (10) obtained from a tree, and a control unit for the harvesting machine, said control unit being arranged to control the marking device to mark the piece of timber, the improvement comprising:

at least one position determining device (5) on the harvesting machine, said position determining device being capable of determining the position of the harvesting machine from external, wirelessly receivable signals, and wherein the control unit is adapted to control the marking device (9) to mark the piece of timber with a position information on the basis of the position information received from the position determining device.

18. System according to claim 17, wherein the harvesting machine comprises means for determining/input of information regarding the quality and/or size of the piece of timber and that the control unit is adapted to control the marking device to mark the piece of timber with quality and size information.

19. System according to claim 17 therefor further comprising means for an automatic determining/manual input of an information regarding the location of a current piece of timber in the log and that the control unit is adapted to control the marking device in order to mark the piece of timber with this location information.

20. System according to claim 17, wherein the control unit comprises means for receiving information regarding the buyer and/or the seller of a single piece of timber and that the control unit is arranged in order to control the marking device to mark the piece of timber with this information regarding buyer and/or seller.

21. System according to claim 17, wherein the position determining device operates in accordance with the Global Positioning System.

22. System according to claim 17, wherein the marking device (9) is located on the harvesting arrangement (3) of the harvesting machine in order to subject pieces of timber to marking in connection to the timber log being processed in the harvesting arrangement.

23. System according to claim 17, wherein the marking device comprises means to operate with a contacting marking technique including at least one of punching, cutting, drilling, stamping, printing and applying a preformed carrier.

24. System according to claim 17, wherein the marking device to mark the pieces of timber with a non-contacting marking technique including at least one of radiant energy and ink-spraying .

25. System according to claim 23, wherein the marking device comprises a plurality of marking means (16) intended for contacting the piece of timber, said marking means being selectively movable between active marking positions and inactive rest positions, whereby the intended marking information for the piece of timber in put together by the control unit depending on desired marking information.

26. System according to claim 25, wherein the marking means (16) are formed as punching means, stamping means or drilling means.

27. System according to claim 26, wherein the marking device has means (24) for supplying marking ink to the marking means.

28. System according to claim 23, wherein the marking device is arranged to generate a carrier provided with marking information and to apply the carrier on the piece of timber.

29. System according to claim 28, wherein the carrier consists of an adhesive strip with the marking information in the form of a bar code or other indicia.

30. System according to claim 24, wherein the marking device has one or several lasers to apply the marking information on the piece of timber.

31. System according to claim 23, wherein the marking device comprises a carrier carrying marking means, said carrier being formed as a rotating means (15).

32. System according to claim 17, wherein the marking device is adapted to apply the marking on one end of the piece of timber.

33. System according to claim 17, wherein the marking device is adapted to apply the marking on a portion of the mantle surface of the piece of timber, optionally after this portion having been relieved from bark.

34. System according to claim 17, wherein the control unit (8) is arranged to wirelessly transfer data determined during the harvesting to an operating centre, said data regarding growth locations, qualities, sizes and optionally locations in the tree of the pieces of timber being subsequently compared with prognoses regarding the harvesting result being made before the harvesting.

35. System according to claim 17, said system comprising a sawmill for sawing of the pieces of timber into boards, within comprising in that a reading device (19,20) to read the marking on a single piece of timber before the sawing and to store the marking information, and a control unit connected with the sawmill to control a further marking device in order to provide boards from the piece of timber in question with a marking comprising at least information about the growth location of the original tree.

36. System according to claim 35, further comprising a reproduction device (19,20) to reproduce an end surface of the piece of timber before the sawing and to register and store information in the reproduction regarding at least one of shape, diameter, bark thickness, and growth.

37. System according to claim 36, comprising it comprises equipment to generate analyses and prognoses regarding forest growth over time concerning the forest area from which the pieces of timber emanates with the aid of said information regarding shape and/or growth.

38. System according to claim 17, further comprising a scanner (28) on the harvesting machine to scan a tree which is to be harvested before the tree in question if felled, said scanner being connected to the control unit (8) in order to transfer the scanning information to the unit, said scanning information being utilised by the control unit as guidance for the adaptation or an adaptation prognosis.

39. System according to claim 17, wherein the position determining device (5) on the harvesting machine comprises at least one position determining unit (27) on the vehicle of the harvesting machine for determining the position of the harvesting arrangement in relation to the position determining unit.

40. System according to claim 39, wherein the means for determining the position of the harvesting arrangement in relation to the position determining unit at least one of distance meters, angle determining means, direction indicators and videophotogrammetry equipment.

* * * * *